Aug. 6, 1957     R. L. MEYER ET AL     2,802,131

IONIC DISCHARGE DEVICE CONSTRUCTION

Filed Nov. 21, 1952

RALPH L. MEYER
SERGE PAKSWER
             INVENTORS.

BY Francis W. Crotty

THEIR ATTORNEY.

United States Patent Office 2,802,131
Patented Aug. 6, 1957

2,802,131

IONIC DISCHARGE DEVICE CONSTRUCTION

Ralph L. Meyer, Elgin, and Serge Pakswer, Elmhurst, Ill., assignors to The Rauland Corporation, a corporation of Illinois Application November 21, 1952, Serial No. 321,932

3 Claims. (Cl. 313—193)

This invention relates to a new and improved construction for ionic discharge devices and is particularly concerned with a method of assembling an ionic rectifier of the grid-controlled type as well as a control electrode structure incorporated in the rectifier.

One of the principal problems in the manufacture and construction of grid-controlled ionic discharge devices is the necessity for adequate radiation of the heat generated by various component parts of the electrode system. Many of these devices utilize vitreous envelopes which tend to retain the heat generated by the electrode system within a confined space and thus cause overheating of the electrodes. It has been proposed that a radiating sleeve or similar structure be incorporated in the envelope and conductively connected to at least one of the electrodes to permit more rapid transfer of heat from the electrode system to the surrounding air. One specific proposal includes incorporation of a metallic sleeve in the device as a sectional portion of the envelope, the sleeve being made out of a metallic alloy suitable for sealing to glass. However, attempts to construct an envelope of this type and to use it in an ionic rectifier have been generally unsuccessful.

One of the difficulties encountered in the manufacture of a device such as that described above is attributable to the fact that the alloys most suitable for sealing to glass are adversely affected by welding operations; that is to say, when electrode elements are welded to the sleeves, small leaks are created in the sleeve itself which make the devices unusable since they cannot maintain the desired internal atmosphere. When an envelope construction such as that described is employed and electrode leads or other metallic elements are sealed into the vitreous portions of the envelope, it becomes extremely difficult to degas the device, because the usual induction heating method of degassing causes a breakdown in the seal between the metallic sleeve and the glass sections of the envelope. In addition, where tantalum anodes are employed, as is often the case when it is desired to use the anode for getter action, the tantalum anode becomes heavily oxidized and cannot be degassed by the usual methods. Where this type of anode is not used, it becomes necessary to add a separate and additional getter element to the usual rectifier electrode system.

It is an object of this invention to provide a method of assembling an ionic discharge device incorporating a composite vitreous-metallic envelope which is not subject to the above noted disadvantages and difficulties.

It is a corollary object of this invention to provide a control electrode structure for an ionic discharge device which is adapted for incorporation in that device after assembly of the envelope, and which is also adapted to maintain contact with a substantial portion of the inner area of a metallic sleeve incorporated in that envelope.

It is a corollary object of this invention to provide a method of assembling of an ionic discharge device which is relatively efficient and expedient and requires a minimum of skill on the part of the assembler.

It is an additional object of this invention to provide a control electrode assembly which is relatively simple and expedient to manufacture and economical to produce.

In one aspect, the invention is directed to a method of assembly for use in the manufacture of an ionic discharge device comprising a vitreous envelope cap section, a metallic envelope sleeve section, a vitreous envelope body section, an anode structure, a cathode structure, and a control electrode structure. The sequence of steps followed in performing the method comprises sealing the metallic sleeve section between the vitreous cap section and the vitreous body section to form a composite vitreous-metallic envelope and subsequently cleaning the internal surfaces of the envelope. The anode structure is then introduced into the envelope through the body and sleeve sections and positioned within that portion of the envelope generally bounded by the cap section, with an extension of the anode structure projecting beyond the confines of the envelope. The control electrode structure is introduced into the envelope and affixed to the metallic sleeve section, after which the anode structure extension is sealed into the vitreous cap section. The cathode structure is then introduced into the envelope and positioned within the portion thereof generally bounded by the vitreous body section, after which it is sealed into the body section.

In another of its aspects, the invention concerns a control electrode-envelope section assembly for incorporation in an ionic discharge device including a composite vitreous-metallic envelope and an anode structure, a cathode structure, and a control electrode structure mounted within that envelope. The assembly comprises a metallic ring member consisting essentially of an alloy suitable for sealing into glass and having a central opening of predetermined configuration and dimensions and further includes a control electrode structure which has an external configuration generally corresponding to that of the ring member opening and which is adapted to be mounted on and supported by the ring member.

The features of the invention which are believed to be novel are set forth with particularity in the appended claims. The organization and manner of operation of the invention itself, together with further objects and advantages thereof, may best be understood by reference to the following description taken in conjunction with the accompanying drawings, in which:

Figure 1:
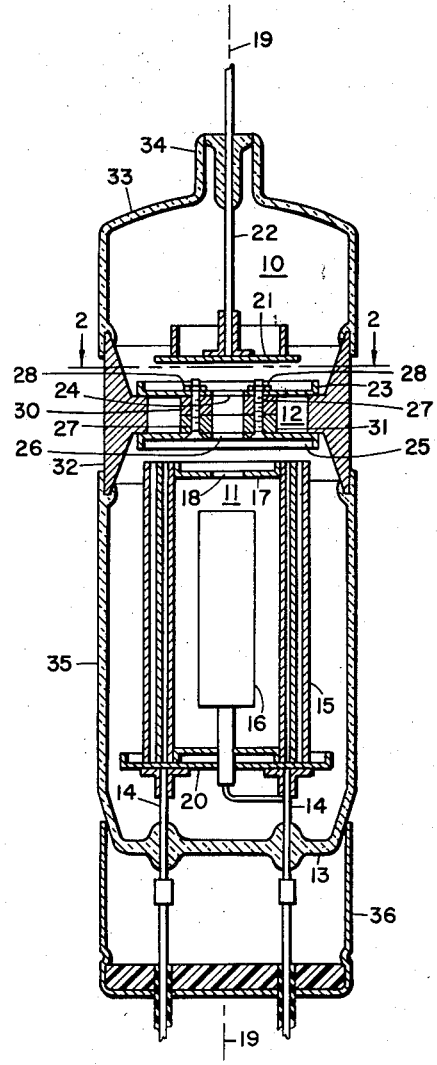
Figure 1 is a cross-sectional view of an ionic discharge device in accordance with the invention.

The structure of the ionic discharge device of Figure 1, which is of the type commercially referred to as a thyratron, is in most respects conventional and includes an anode structure 10, a cathode structure 11 and a control electrode structure 12. Cathode structure 11 includes a vitreous base 13 into which are sealed two conductive supporting leads 14. A heat shield 15 is supported by and conductively connected to leads 14 and consists essentially of a sheet metal enclosure of multiple wall construction. An emitter 16 is mounted within the confines of heat shield 15 and is electrically connected to one of the supporting leads 14. It should be noted that emitter 16 may be of either the directly heated or indirectly heated types; possible heater elements and connections have been omitted from the drawing since they are of no interest in relation to the instant invention. A top plate 17, which forms a part of heat shield 15, is provided with an aperture 18 substantially concentric with the central axis 19 of the ionic discharge device, and a bottom plate 20 completes the heat shield structure. Anode structure 10 comprises an anode plate 21 affixed to an anode extension 22 and is mounted substantially coaxially with cathode structure 11.

Control electrode structure 12 comprises a top plate 23 having a central opening 24 and a bottom plate 25 having a central opening 26, the two central openings being substantially coaxial with respect to anode structure 10 and cathode structure 11. Plates 23 and 25 are clamped together by a pair of bolts 27, the heads of which are seated in plate 25 and which are threaded into two nuts 28 affixed to top plate 23. The control electrode plates are maintained in fixed relation to each other by two spacing washers 30 and 31 affixed to plates 23 and 25 respectively. Bolts 27 also maintain plates 23 and 25 in conductive heat transferring contact with a metallic ring member or sleeve 32, which forms part of the outer envelope of the device. Sleeve 32 consists essentially of an alloy suitable for sealing into glass, such as the familiar 42% nickel-iron or the sealing alloys known commercially as "Kovar" or "Fernico." A vitreous cap section 33 having a reduced neck portion 34 is sealed to one rim of sleeve 32, while a tubular body section 35 is sealed to the other rim of the sleeve and to the vitreous base section 13 of cathode structure 11. Anode extension 22 is sealed into neck portion 34 of cap section 33 and projects therefrom to provide for electrical connection to the anode. It will be seen that cap section 33, ring 32 and body section 35 comprise a composite vitreous-metallic envelope which, in conjunction with base 13 and the seal between neck portion 34 and extension 22, encloses a sealed chamber; this chamber is filled with one of the noble gases such as xenon or argon or may be filled with mercury vapor. A base 36, which may be of any well known type, is mounted on the envelope and provides means for supporting and positioning the device when it is placed in operation and for connecting external circuit elements to the cathode.

It will be recognized by those skilled in the art that the described ionic discharge device includes all of the essential elements of a grid controlled ionic rectifier of the type known as a thyratron; accordingly, a detailed description of the operation of the device is deemed unnecessary. In brief, operation of the device is predicated upon the establishment of an ionic discharge between emitter 16 and anode plate 21, the initiation of the discharge being controlled by the potential applied to control electrode structure 12 and the discharge itself following the path determined by openings 18, 24 and 26. The application of a control potential to electrode 12 may be accomplished in any suitable manner, as by a lead clipped or soldered to ring 32.

Standard procedure in the manufacture of both electronic and ionic discharge devices usually dictates that the various electrode structures be assembled in their complete form, mounted in the tube envelope, and then cleaned and degassed prior to fixing the required operating atmosphere within the envelope. However, as pointed out in the preliminary portion of this specification, application of this procedure to a discharge device of the type described above frequently results in production of an inoperative device, due to the formation of minor leaks or pin holes in the metallic envelope section or to failure to adequately clean and degas the electrode structures and the sleeve. To obtain the advantages of this type of structure, the following sequence of assembly steps may be utilized:

(1) The metallic sleeve section, ring 32, is sealed between vitreous cap section 33 and vitreous body section 35 to form a composite vitreous-metallic envelope. The opening of neck 34 remains unsealed.

(2) The inside of sleeve 32 is cleaned by the electrolysis process, commonly known as electro-polishing. This operation, which is well known in the art, comprises immersing the structure in an electrolytic solution and establishing a current between ring 32 and another suitable electrode immersed in the solution, ring 32 comprising the anode of the system.

(3) Following the electropolishing, the envelope is dried and anode structure 10 is introduced into the envelope through the opening in body section 35 and is positioned within that portion of the envelope generally bounded by cap section 33, extension 22 projecting through neck 34.

Figure 2:
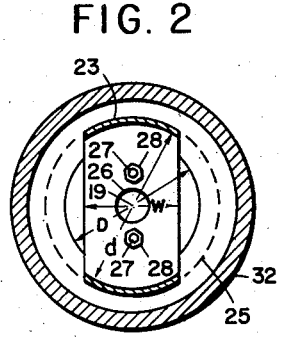
Figure 2 is an enlarged view of a portion of the device of Figure 1, taken along line 2—2.

(4) Top plate 23, on which nuts 27 and washers 30 have been previously mounted and which has been vacuum fired, is introduced longitudinally into the envelope through the opening in body section 35 and is moved through the central opening of sleeve 32 into that portion of the envelope generally bounded by cap section 33 as will be more completely described in conjunction with Figure 2; plate 23 is then brought to rest upon the upper surface of sleeve 32. The second or lower plate 25 is then introduced into the envelope and is clamped against sleeve 32 in fixed spacial relation to plate 23 by means of bolts 27.

(5) Anode extension 22 is sealed into neck 34 of vitreous cap section 33 in the usual manner, care being taken to avoid oxidation of the anode.

(6) Cathode structure 11 is introduced into the envelope through the opening in body section 35 and is positioned within that portion of the envelope generally bounded by the body section, after which vitreous base 13 of cathode structure 11 is sealed to the adjacent walls of body section 35.

It will be understood that base 13 of cathode structure 11, during the preliminary stages of manufacture, includes a tube which may be used to exhaust the envelope after it is completed and sealed as described above and may further be used to introduce into the envelope a desired atmosphere which is usually one of the rare or noble gases or may be mercury vapor. It is, of course, possible to include such a tube in either base section 35 or cap section 33; accordingly, the tube has not been shown.

Figure 2 shows control electrode structure 12 as viewed from line 2—2 of Figure 1. As seen in this view, disc 23 has a principal dimension or diameter $d$ which is greater than the internal diameter $D$ of the opening in metallic ring 32. If disc 23 were circular in form, it is obvious that it would not fit through the ring opening and it would not be possible to follow the outlined method of assembly. However, a part of the disc is cut away so that it has a secondary dimension $w$ which is smaller than the ring opening and which therefore permits passage of disc 23 through the ring opening. Inasmuch as disc 25, the periphery of which is shown in dotted outline, is not required to pass through the opening in ring 32, it preferably is completely circular and has a principal dimension or diameter greater than diameter $D$; this closes off the ring opening and leaves only central opening 26 as a possible arc path between anode 10 and emitter 16 (Figure 1). It should be noted that the circular configuration of the central opening of ring member 32 and of the discs 23 and 25 is primarily illustrative and that any other geometrical configuration such as rectangular or triangular may be used.

Figure 3:
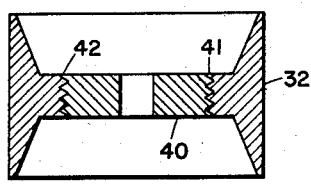
Figure 3 is a cross-sectional view of another embodiment of a portion of the device of Figure 1.

In Figure 3, another embodiment of control electrode 12 is shown. Here, the structure comprising plates 23 and 25, bolts 27, and nuts 28 is replaced by a single disc 40 which has a threaded peripheral surface 41. In addition, ring 32 is modified to include a central opening having an internally threaded surface 42. Threads 41 of disc 40 engage threads 42 of the ring member to maintain disc 40 in fixed conductive engagement therewith. It will be apparent that this structure permits mounting of the control electrode in the envelope after anode 10 has been positioned therein and at the same time provides the necessary conductive engagement between the control electrode and the ring to effect rapid conduction of heat from control electrode 40 to ring 32 and thence to the air surrounding the device. The discs are preferably vacuum fired before mounting.

Figure 4:
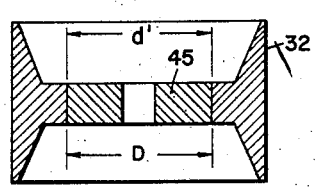
Figure 4 is a cross-sectional view of an additional embodiment of the same portion of the device of Figure 1.

Figure 4 is in most respects similar to Figure 3, with the exception that the control electrode disc, here designated 45, does not have a threaded periphery and the opening of ring 32 is unthreaded. As originally formed, at room temperature, the diameter or principal dimension $d'$ of disc 45 is somewhat larger than the internal diameter D of ring 32; the difference in the two dimensions is of the order of .001". During assembly, control electrode 45 is cooled or refrigerated so that it shrinks sufficiently to reduce diameter $d'$ below ring diameter D. Control electrode 45 is then inserted within the center opening of ring 32 and, as it rises in temperature, expands into close conductive engagement with the ring member. This type of mounting, which is normally termed thermal shrinkage, permits mounting of the control electrode subsequent to the positioning of anode 10 within the envelope and provides adequate thermally conductive coupling to ring member 32.

While particular embodiments of the present invention have been shown and described, it is apparent that changes and modifications may be made without departing from the invention in its broader aspects. The aim of the appended claims, therefore, is to cover all such changes and modifications as fall within the true spirit and scope of the invention.

We claim:

1. In the manufacture of an ionic discharge device comprising a vitreous envelope cap section, a metallic envelope sleeve section, a vitreous envelope body section, an anode structure, a cathode structure, and a control electrode structure, the method of assembly comprising the following sequence of steps: sealing said metallic sleeve section between said vitreous cap section and said vitreous body section to form a composite vitreous-metallic envelope; cleaning the internal surfaces of said envelope; introducing said anode structure into said envelope through said body and sleeve sections and positioning said anode structure within the portion thereof generally bounded by said cap section, with an extension of said anode structure projecting beyond the confines of said envelope; introducing said control electrode structure into said envelope; affixing said control electrode structure to said metallic sleeve section; introducing said cathode structure into said envelope and positioning said cathode structure within the portion thereof generally bounded by said vitreous body section; and sealing said cathode structure into said vitreous body section.

2. In the manufacture of an ionic discharge device comprising a vitreous envelope cap section, a metallic envelope sleeve section, a vitreous envelope body section, an anode structure, a cathode structure, and a control electrode structure, the method of assembly comprising the following sequence of steps: sealing said metallic sleeve section between said vitreous cap section and said vitreous body section to form a composite vitreous-metallic envelope; cleaning the internal surfaces of said envelope; introducing said anode structure into said envelope through said body and sleeve sections and positioning said anode structure within the portion thereof generally bounded by said cap section, with an extension of said anode structure projecting beyond the confines of said envelope; introducing said control electrode structure into said envelope; affixing said control electrode structure to said metallic sleeve section; sealing said extension of said anode structure into said vitreous cap section; introducing said cathode structure into said envelope and positioning said cathode structure within the portion thereof generally bounded by said vitreous body section and sealing said cathode structure into said vitreous body section.

3. An ionic discharge device comprising: a vitreous envelope cap section; a vitreous envelope body section; a conductive envelope ring section sealed between said vitreous envelope sections to form therewith a composite vitreous-metallic envelope, said ring section having a central opening of predetermined dimensions; an anode, adapted to pass through said ring section opening, mounted within the portion of said envelope generally bounded by said cap section; a cathode structure mounted within the portion of said composite envelope generally bounded by said body section; a first conductive disc member having a principal dimension greater than the largest of said ring opening dimensions and a secondary dimension smaller than the largest of said ring opening dimensions to permit passage of said first disc member through said opening, said first disc member having an aperture to permit passage of an arc discharge therethrough; a second disc member having dimensions greater than the corresponding dimensions of said ring opening and further having an aperture to permit passage of an arc discharge therethrough; and means mounting said disc members in fixed spatial relationship to each other and in heat-transferring contact with said ring section.

References Cited in the file of this patent

UNITED STATES PATENTS

| | | |
|---|---|---|
| 1,850,104 | Hansell | Mar. 22, 1932 |
| 2,129,314 | Boumeester | Sept. 6, 1938 |
| 2,151,781 | Lindenblad | Mar. 28, 1939 |
| 2,212,556 | Baier | Aug. 27, 1940 |
| 2,402,029 | Dinnick et al. | June 11, 1946 |
| 2,459,859 | Weston | Jan. 25, 1949 |
| 2,532,846 | Jonker | Dec. 5, 1950 |
| 2,553,569 | Flarity | May 22, 1951 |